Nov. 4, 1969  F. V. BROSSEIT  3,475,974
JAM-FREE INDEXING MECHANISM
Filed Jan. 4, 1968  3 Sheets-Sheet 1

INVENTOR
F. V. BROSSEIT
By B. C. Levine
ATTORNEY

Nov. 4, 1969  F. V. BROSSEIT  3,475,974
JAM-FREE INDEXING MECHANISM
Filed Jan. 4, 1968  3 Sheets-Sheet 2

Nov. 4, 1969

F. V. BROSSEIT 3,475,974

JAM-FREE INDEXING MECHANISM

Filed Jan. 4, 1968

United States Patent Office 3,475,974
Patented Nov. 4, 1969

1

3,475,974
JAM-FREE INDEXING MECHANISM
Fritz V. Brosseit, Kansas City, Mo., assignor to Western Electric Company, Incorporated, New York, N.Y., a corporation of New York
Filed Jan. 4, 1968, Ser. No. 695,637
Int. Cl. F16h 25/08, 25/16
U.S. Cl. 74—55                                6 Claims

ABSTRACT OF THE DISCLOSURE

A cam operated drive cyclically imparts a rectangular motion to a feed pawl, which advances a movable platform by engaging a first rack thereon. At the end of each advance, a spring-loaded roller arranged to exert a force normal to the platform engages an oblique projection on a second rank affixed to the platform to cam the platform in a forward direction. The resulting overtravel of the platform assures an initial clearance between the pawl and the first rack at the start of the next cycle.

BACKGROUND OF THE INVENTION

Applicant's co-pending application Ser. No. 682,358, filed Nov. 13, 1967, now Patent No. 3,435,986, describes and claims a circumferentially indexible slotted cylinder for radially dispensing a succession of articles propelled into one end of the cylinder. The cylinder individually discharges the articles into successive compartments of a coordinate tray carried on a movable platform below the cylinder. For this purpose, each row of the tray is successively advanced into registration with the cylinder axis by a cam-controlled indexing mechanism driven in timed relation to the cylinder. After each row of the tray has been filled by the cylinder, a new row is advanced under the cylinder to be filled during the next revolution of the latter.

The platform indexing mechanism includes a pawl driven in a rectangular path to intermittently engage and advance an underlying adjacent right triangular tooth on a first rack which is affixed to a top surface of the platform.

In order to start each advance of the platform, the pawl must move vertically downward into engagement with a rear bearing surface of the adjacent tooth on the first rack. Since the pitch of the teeth in the first rack is made substantially equal to the forward movement of the pawl to assure accurate indexing, it is possible (because of eccentricities in the cam drive and the like) for the pawl to intermittently contact the top surface of the tooth rather than its rear bearing surface, and thereby effectively jam the indexing mechanism.

SUMMARY OF THE INVENTION

This jamming problem may be avoided with the use of the arrangement of the present invention. In an illustrative embodiment, a second rack is affixed to the bottom surface of the platform. The second rack is provided with a succession of triangular second teeth each vertically aligned with the first teeth and having the same pitch. Each second tooth is defined by a pair of oblique portions that respectively extend outwardly from and inwardly toward the bottom surface of the platform in the direction of advance. A stationary spring-loaded roller disposed below the platform bears upwardly against the second gear rack. The roller is located to engage the outwardly extending portion of the adjacent second tooth at the termination of each forward advance of the pawl.

The resulting camming action between the roller and the engaged portion of the tooth imparts a slight overtravel to the platform as soon as the pawl has disengaged from the associated first tooth. Thus, when the pawl again descends to the first rack during the next cycle, the rear bearing surface of the first tooth is disposed slightly ahead of its normal position. This provides a positive longitudinal clearance between the pawl and the rear surface of the first tooth, and thereby prevents interference therebetween.

BRIEF DESCRIPTION OF THE DRAWING

The nature of the invention and advantages will appear more fully from the following detailed description taken in conjunction with the appended drawing, in which.

DETAILED DESCRIPTION

Figure 1:
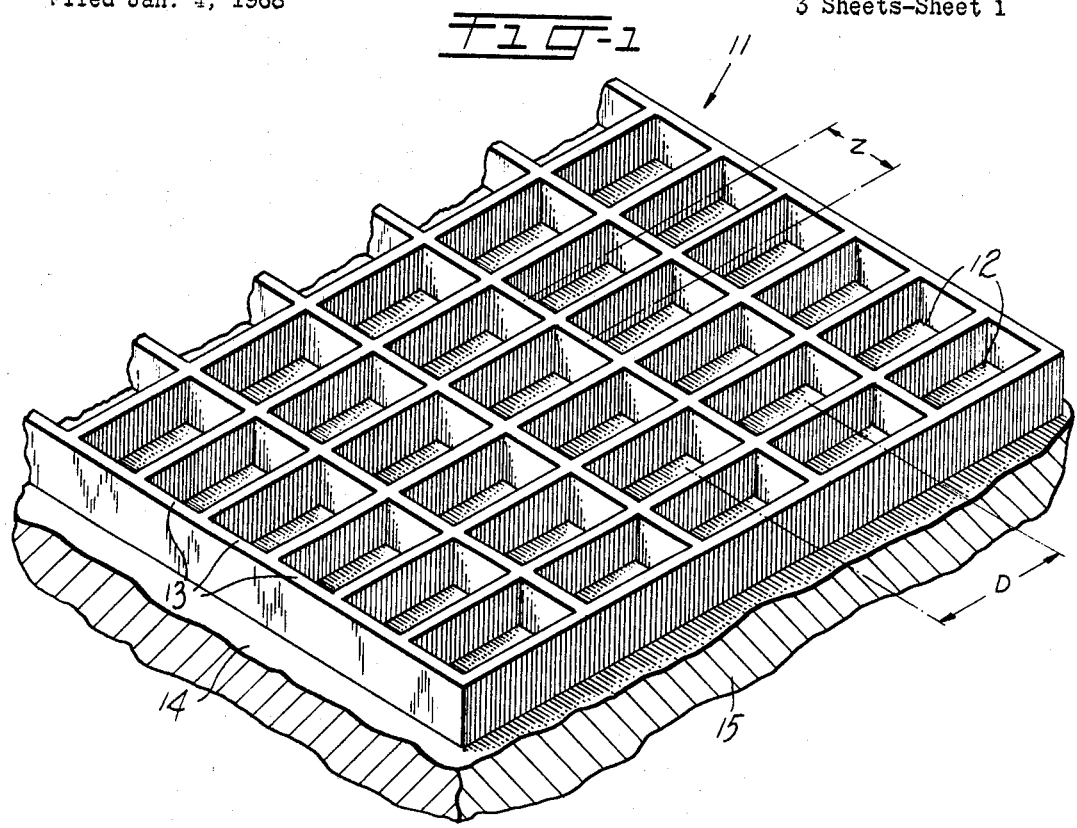
FIG. 1 is a perspective view of a platform-mounted coordinate tray which may be indexed in accordance with the invention.

Referring now in more detail to the drawing, FIG. 1 illustrates a tray 11 having a plurality of article receiving compartments 12—12 coordinately arranged in a succession of parallel rows 13—13. Adjacent ones of the rows are separated by a center distance Z. Each row illustratively has five of the compartments 12 aligned end to end, and adjacent compartments in each row are separated by a center distance D.

Figure 2:
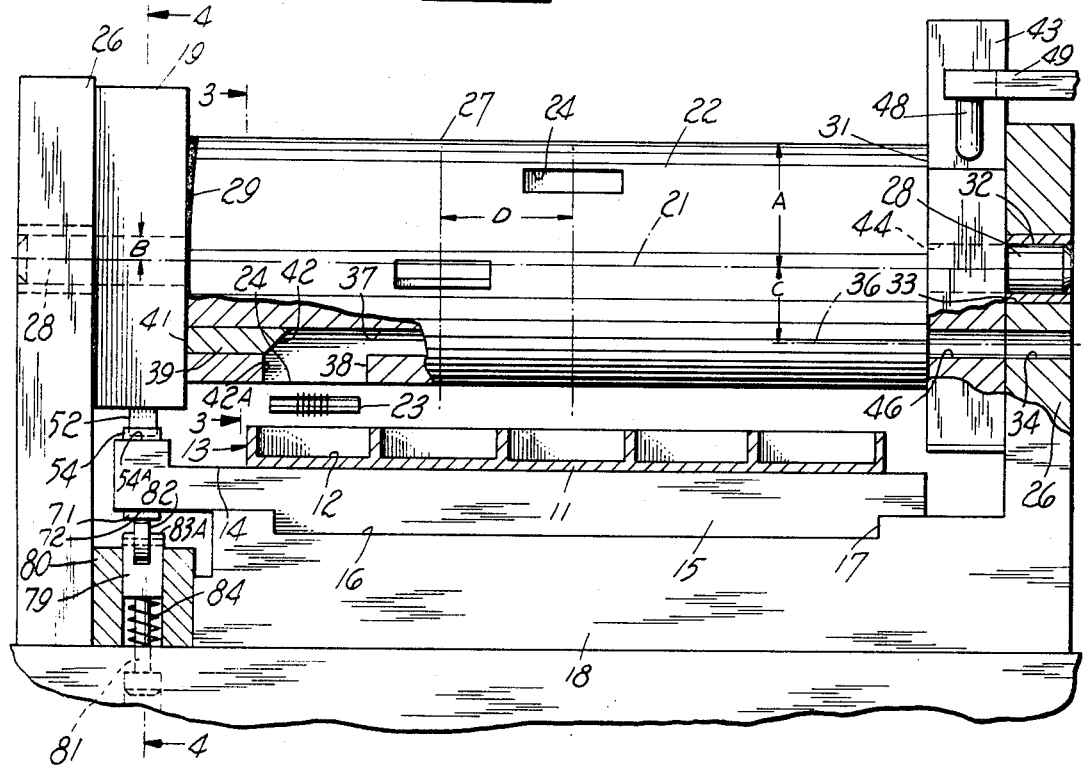
FIG. 2 is a front elevation of a slotted cylinder for dispensing articles to the tray of FIG. 1.

As shown best in FIG. 2, the tray 11 is attached to a top surface 14 of a platform 15, which is slidably mounted in a first recess 16 defined by a pair of parallel guide surfaces 17—17 on a base 18. The platform 15 may be advanced by means of a suitable indexing drive 19 (described in more detail below) in the direction into the drawing and perpendicular to a horizontal axis 21 of an overlying slotted cylinder 22. The cylinder may be of the type described in applicant's above-mentioned co-pending application for individually dispensing a plurality of articles 23 (one of which is shown) to each compartment 12 on the tray 11. The articles are discharged through a plurality of longitudinally and circumferentially spaced slots 24—24 on the cylinder periphery. Adjacent ones of the slots 24 are longitudinally separated by an amount equal to the center distance D between successive compartments 12 in the tray 11.

The cylinder 22 may be supported for rotation about its axis 21 between a pair of axially spaced upright standards 26—26 affixed to the base 18. For this purpose, the cylinder includes a central portion 27 of radius A and a pair of opposite end trunnions 28—28 of radius B. The trunnions 28 extend respectively from a left end 29 and a right end 31 of the central portion 27. The trunnions are journaled within a pair of sleeve bearings 32—32 respectively received in a pair of central apertures 33—33 in the standards 26.

The right standard 26 is provided with an axial bore 34 into which a succession of the articles 23 to be dispensed by the cylinder may be propelled seriatim into the cylinder from a suitable source (not shown). An axis 36 of the bore 34 extends parallel to and directly below the axis 21 of the cylinder. The axis 36 passes through the cylinder at a radius C, which is smaller than the radius A of the central portion 27 but greater than the radius B of the trunnions 28.

Figure 3:
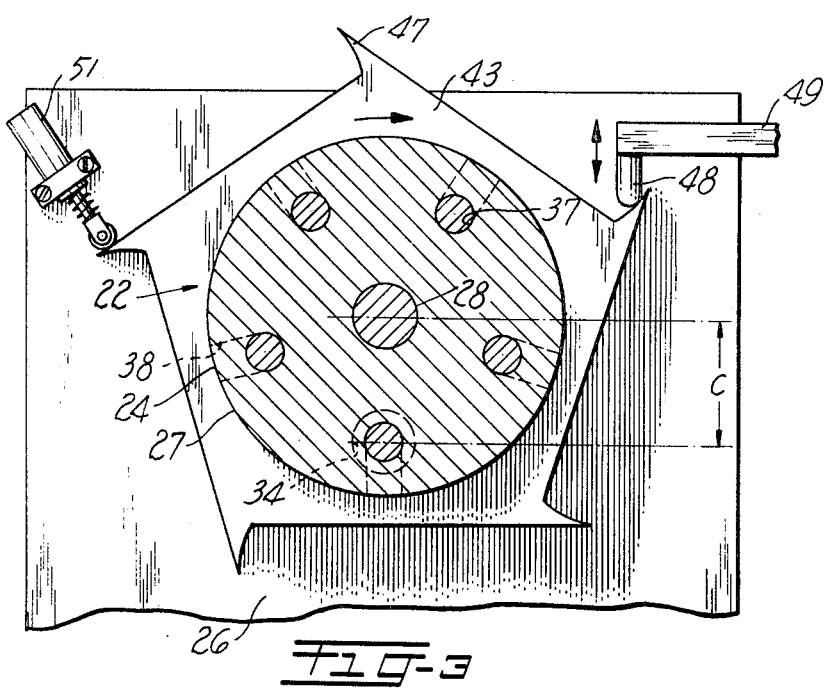
FIG. 3 is a sectional end view, taken along line 3—3 of FIG. 2, illustrating an indexing arrangement for the cylinder.

As best shown in FIG. 3 the central portion 27 of the cylinder 22 is provided with five longitudinally extending internal bores 37—37. The bores 37 are arranged circumferentially about the cylinder axis at equal angular intervals. Each bore 37 is centered at the radius C.

The peripheral slots 24 on the cylinder are individually aligned radially with the five axial bores 37 and communicate therewith via a plurality of radial discharge passages 38—38. Each bore 37 is terminated by an elongated cyindrical stop plug 39 (FIG. 2). The plug 39 may be press-fitted or otherwise securely received in the associated bore. A left end 41 of each plug is disposed flush with the left end 19 of the central portion 27. A right end 42 of each plug 39 is bevelled at an angle of 45° to both the associated bores 37 and the associated radial passage 38. The length of each plug 39 is chosen such that the bevelled right end 42 is disposed adjacent a left 42A of the associated radial passage for deflecting a propelled article 23 out of the cylinder through the radial passage 38 and the peripheral slot 24.

The cylinder 22 may be indexed about its axis 21 by means of a ratchet mechanism shown in FIG. 3. The latter is arranged to move successive ones of the bores 37 into axial registration with the bore 34 in the right standard 26 (FIG. 2) for receiving successive ones of the propelled articles 23. The drive includes a ratchet wheel 43 having a central bore 44 for receiving the right trunnion 28 of the cylinder 22 between the central portion 27 and the right standard 26. The ratchet wheel 43 may be affixed to the right end 31 of the central portion 27 by suitable screws (not shown) or the like.

The wheel 43 is further provided with five axial bores 46—46 (one of which is shown) arranged around the axis 21 on the radius C. The bores 46 are oriented to be in alignment with the five axial bores 37 in the central portion 27.

The periphery of the wheel 43 is defined by five equiangularly spaced teeth 47—47 (FIG. 3) successively engageable by a drive pawl 48 affixed to a suitable linkage 49. The linkage 49 may be periodically moved downwardly (by means not shown) from the position shown in FIG. 3 to impart a corresponding downward movement to the pawl 48. Each downward movement of the pawl 48 drives the wheel 43 through an angular increment of 72° in a clockwise direction as viewed in the figure. Reverse motion of the wheel during a subsequent upward movement of the pawl 48 is prevented by a suitably located spring-loaded stop pawl 51.

Each complete revolution of the ratchet wheel 48 (and thus the cylinder 22) will cause the bores 37 to move successively into registration with the bore 34 to individually receive a succession of the propelled articles 23 (FIG. 2). The peripheral slot 24 associated with the aligned bore will be disposed at the bottom of the cylinder. Thus, the successive peripheral slots 24 will be disposed at the bottom of the cylinder (i.e., opposite the tray 11) in a recurrent order that progresses from left to right in FIG. 2 as the cylinder revolves in a clockwise direction as viewed in FIG. 3.

The underlying tray 11 (FIG. 2) is positioned on the platform 15 in such a manner that (a) the five compartments 12 in each row extend parallel to the cylinder axis 21 and (b) the centers of successive ones of the compartments 12 are vertically aligned with successive ones of the peripheral slots 24 in the cylinder. With this arrangement, the articles 23 may be individually dispensed by the cylinder into the compartments 12 of the aligned row 13 on the tray in an order that proceeds from left to right as viewed in FIG. 2.

The platform indexing drive 19 (FIG. 4) includes a pawl 52 selectively engageable with successive ones of a plurality of first right triangular teeth 53—53 of height Y. The teeth 53 define a first rack 54 (FIG. 2) disposed along a surface 54A of the platform 15. The length, or pitch, of the teeth 53 (FIG. 4) is chosen to correspond to the center distance Z between successive rows 13 (FIG. 1) of the tray 11. Thus, the tray may be positioned on the platform such that each movement of the latter through the distance Z places a separate row 13 into vertical alignment with the cylinder axis 21 (FIG. 2) and with the underlying axis 36.

The pawl 52 (FIG. 4) is driven in a rectangular path by a compound yoke mechanism 55 under the control of a cam 56 which is keyed to the left cylinder trunnion 28 (FIG. 2) for rotation therewith. The cam 56 is disposed between the left end 29 of the central portion 27 and the left standard 26. An inner yoke 57 (FIG. 4) having a rectangular inner opening 58 surrounds the outer surface of the cam 56 for selective engagement therewith. The inner yoke 57 is provided with opposed pairs of horizontal and vertical walls 59—59 and 61—61, respectively, which are so dimensioned as to constrain the inner yoke 57 for vertical movement only within a rectangular inner opening 62 of a surrounding outer yoke 63. For this purpose, the outer surfaces of the vertical walls 61 of the inner yoke 57 slidably engage corresponding inner surfaces on a pair of vertical walls 64—64 of the outer yoke 63. The total vertical movement of the inner yoke 57 is made equal to a distance P slightly greater than the height Y of the teeth 53.

The outer yoke 63 is constrained for horizontal movement only within a rectangular internal opening or cavity 66 of a surrounding outer block 67. To accomplish this the outer surfaces of a pair of horizontal outer walls 68—68 of the outer yoke 63 selectively engage corresponding inner surfaces of a pair of horizontal walls 69—69 of the block 67. The total horizontal movement of the outer yoke 63 is made generally equal to the pitch Z of the teeth 53.

Figure 5:
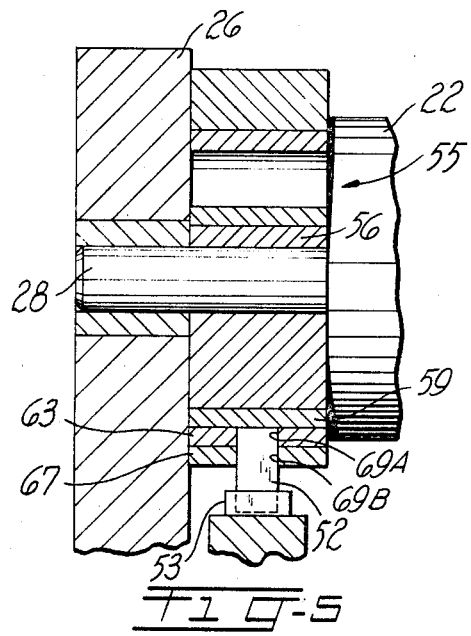
FIG. 5 is a sectional side view, taken along line 5—5 of FIG. 4, illustrating certain details of the platform indexing mechanism.

In order to engage an underlying tooth 53 of the rack 54, the pawl 52 extends downwardly from the bottom horizontal wall 59 of the inner yoke 57 and through a pair of aligned slots 69A and 69B (FIG. 5) running lengthwise along the bottom horizontal surfaces of the outer yoke 63 and the surrounding block 67, respectively.

Figure 4:
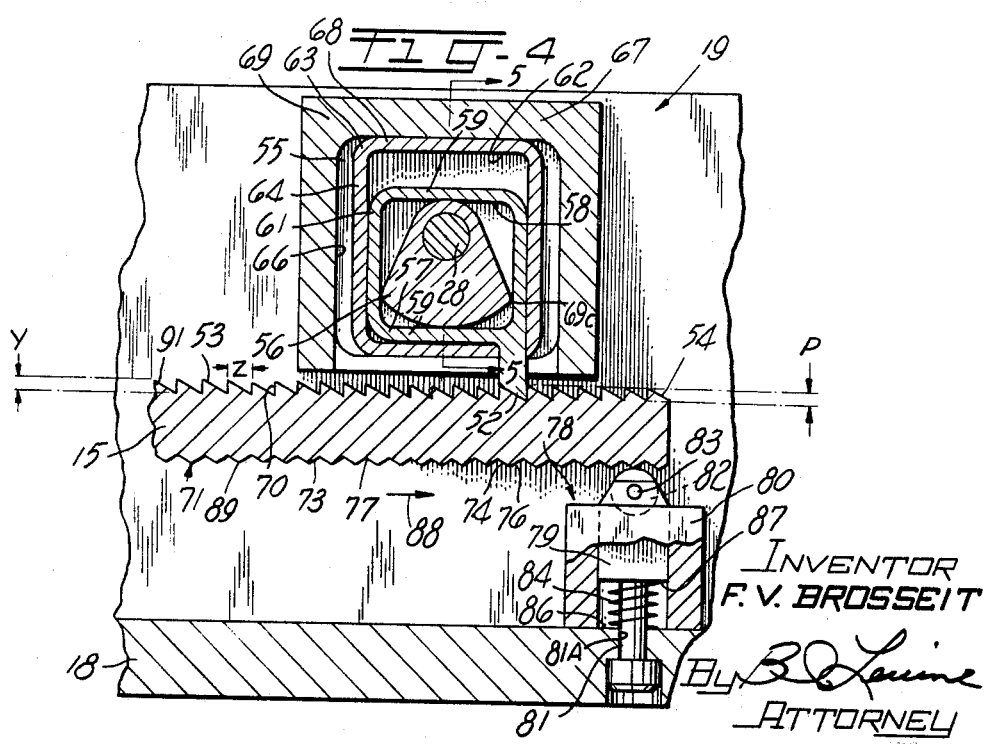
FIG. 4 is a sectional end view, taken along line 4—4 of FIG. 2, of a platform indexing mechanism constructed in accordance with the invention for advancing the tray of FIG. 1.

Each indexing revolution of the cylinder 22 (FIG. 3) in the clockwise direction as viewed in FIG. 3 will drive the cam 56 (FIG. 4) through one revolution in the counter-clockwise direction as viewed in FIG. 4. During this latter movement, a leading edge 69C of the cam will engage successive portions of the periphery of the rectangular opening 58 in the inner yoke 57. Since the yoke 57 is constrained for vertical movement only relative to the surrounding outer yoke 63, the cam 56 will impart a reciprocal movement to the yoke 57 in the vertical plane within the surrounding yoke 63. The pawl 52 will move vertically, in a corresponding manner, into and out of engagement with the rack 54.

Moreover, since the yoke 63 is constrained for horizontal movement only relative to the surrounding block 67, each horizontal component of force imparted to the inner yoke 57 by the cam 56 will be transmitted through the adjacent vertical walls 61 and 64 of the inner and outer yokes 57 and 63. This force transmission in turn will impart a reciprocal movement to the outer yoke 63 (and thus the inner yoke 57) in the horizontal plane within the surrounding block 67. The pawl 52 will thereupon execute a corresponding horizontal movement within the aligned slots 69A and 69B (FIG. 5) in the yoke 63 and the block 67.

Thus, each rotation of the cam 56 will be resolved by the yoke mechanism 55 (FIG. 4) into horizontal and vertical movements of the pawl 52 so that the latter will define a rectangular path in the vertical plane as viewed in FIG. 4. The rectangular path will have left and right (i.e., backward and forward) components of distance Z and upward and downward components of distance P. During each forward movement of the pawl 52, i.e., to the right in FIG. 4, the pawl will engage a vertical bearing surface 70 of an adjacent tooth 53 and will advance the first rack 54 (and thus the platform 15) by the distance Z. This in turn will move successive ones of the rows 13 (FIG. 2) on the tray 11 into registration with the vertical plane defined by the cylinder axis 21 and the underlying axis 36 to receive the articles 23.

In accordance with the invention, a second gear rack 71 is mounted on a bottom surface 72 of the platform 15 opposite the first rack 54. The rack 71 includes a plurality of second triangular teeth 73—73 (FIG. 4) having generally the same pitch as the first teeth 53. Each second tooth 73 is defined by first and second oblique faces 74 and 76 respectively extending outwardly from and inwardly toward the platform 15 in the direction of advance. A junction 77 between each pair of successive teeth 73 is aligned with the vertically extending bearing surface 70 of a first tooth 53.

A resilient pusher device 78 is suitably affixed to the base 18 in vertical alignment with the second rack 71 for engaging and applying an upward force against the adjacent overlying second tooth 73. The device 78 includes an inner plunger 79 mounted for vertical movement within a stationary and hollow outer housing 80. The plunger is held and guided in the housing 80 by means of a headed bolt 81 slidably mounted within a suitable bore 81A extending vertically through a section of the base 18. The bore 81A is counterbored as shown to receive the head of the bolt 81.

A vertically disposed roller 82 is affixed to a shaft 83, which is carried horizontally in a pair of bifurcations 83A—83A (FIG. 2) formed by slotting an upper portion of the plunger 79. The top surface of the roller is resiliently urged upwardly against the then-adjacent second tooth 73 (FIG. 4) by means of a compression spring 84. The spring 84 is disposed within the housing 80 with a lower end 86 of the spring secured to the base 18 and an upper end 87 of the spring in engagement with the bottom surface of the plunger 79.

Figure 6:
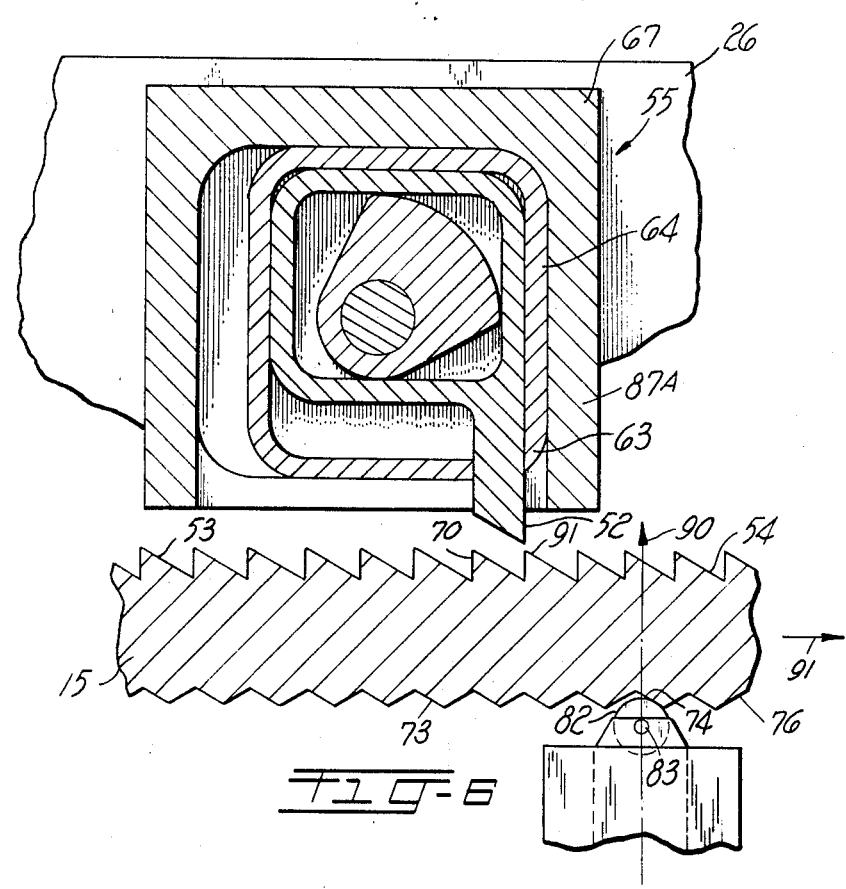
FIG. 6 is an enlarged sectional end view similar to FIG. 4 and illustrating the relative position of the parts of the indexing mechanism at the terminating of each indexing movement.

The device 78 is longitudinally positioned with respect to the yoke 55 in such a manner that the roller 82 is vertically aligned with the outwardly extending portion 74 (FIG. 6) of an adjacent one of the second teeth 73 at the completion of each indexing movement of the platform 11 (i.e., at the conclusion of each forward movement of the pawl 52). This situation will occur, as shown in FIG. 6, when the right-hand vertical wall 64 of the outer yoke 63 is in engagement with a right-hand vertical wall 87A of the surrounding outer block 67.

The operation of the mechanism of FIGS. 1–6 is as follows. At the start of the indexing revolution of the cylinder 22 (FIG. 2) it will be assumed that an empty row 13 of compartments 12 is disposed in vertical alignment with the cylinder axis 21 and the underlying axis 36 to receive a sequence of five articles 23 from the cylinder. At this time, the platform drive pawl 52 will be in its right-most and lower-most position (hereafter called "initial" position) as viewed in FIG. 4. As the cylinder 22 (FIG. 2) is indexed about its axis by the pawl 48 (FIG. 3) the successive articles 23 (FIG. 2) are dispensed from successive peripheral slots 24 on the cylinder periphery to the successive compartments 12 in the aligned row of the tray 11.

During this dispensing operation the movement of the cam 56 by the cylinder 22 causes the platform drive mechanism 19 to move the pawl 52 counter-clockwise, as viewed in FIG. 4, from its initial position through the upward, backward and downward portions of its rectangular path.

After an article 23 has been dispensed into the right-most tray compartment 12 (FIG. 2) to complete the dispensing operation for that row, the drive pawl 48 (FIG. 3) rotates the cylinder into position to start the next indexing cycle. Simultaneously with this last-mentioned movement, the corresponding movement of the cam 56 (FIG. 2) causes the mechanism 19 to move the platform drive pawl 52 through the forward, platform-engaging portion of its rectangular path, thereby advancing a new row of tray compartments into alignment with the cylinder axis 21 and the axis 36.

At the point of time shown in FIG. 4, the pawl 52 is approaching but has not yet reached the end of its forward travel in the direction of an arrow 88 during the last-mentioned advance. At this point, the top surface of the roller 82 is aligned with an intersection or apex 89 of the first and second faces 74 and 76 of the adjacent second tooth 73. The upward pressure of the roller 82 when in this position will not be effective to impart any increment of horizontal movement to the platform 15.

However, once the pawl 52 has reached the end of its forward travel, further rotation of the cam 56 by the cylinder 22 (FIG. 2) will cause the mechanism 19 to lift the pawl 52 out of engagement with the first rack 54. At this later point in time, which is shown in FIG. 6, the roller 82 will be in engagement with a point on the outwardly extending face 74 of the overlying second tooth 73, as explained above. Since the platform 15 is neither driven nor restrained by the now-lifted pawl 52 at this time, the upward pressure of the roller 82 (represented by an arrow 90) against the oblique face 74 will provide a forward component of force (represented by an arrow 91) to cam the latter face to the right and will thus impart a momentary increment of motion to the platform 15. This added component will move the first teeth 53 of the first rack 54 by a corresponding increment in the same direction. Thus, at the start of the next platform advance (i.e., when the pawl 52 is moved downwardly by the yoke mechanism 55 to engage the next succeeding first tooth 53), the pawl will move into a position behind the rear bearing surface 70 of the adjacent first tooth with a positive clearance. This precludes any possibility of interference or "hang-up" between the pawl and a top surface 91 of the adjacent first tooth, which might otherwise result from the assumed equality of the forward pawl movement and the pitch of the first teeth. Thus, the overtravel or "kick" imparted to the platform by the pressure of the spring-loaded roller 82 against the outwardly extending face 74 of the adjacent second tooth 73 assures jam-free indexing of the platform.

It will be understood that the above-described arrangements are merely illustrative of the principles of the invention. Many other variations and modifications will now occur to those skilled in the art. Such variations may be made without departing from the spirit and scope of the invention.

What is claimed is:

1. Apparatus for indexing a movable platform which comprises:
   a rack carried on one surface of the platform and including a succession of teeth having a pitch equal to a first distance and extending in a first direction, each tooth having a camming face extending obliquely from the rack in the first direction;
   means for intermittently advancing the platform by the first distance in the first direction; and
   resilient means biased perpendicularly against the rack for continually applying a component of force against the then-opposed tooth, the resilient means positioned in alignment with the camming face of a tooth at the end of each intermittent advance, whereby the resulting camming action between the camming face and the resilient means imparts an additional increment of movement to the platform in the first direction prior to the start of the next advance.

2. Apparatus for indexing a horizontal platform in a first direction in a horizontal plane, which comprises:
   a first rack disposed on one face of and extending along the platform in the first direction, the first rack including a succession of first teeth, each tooth having a vertical bearing surface;

a second rack disposed on the opposite face of the platform and extending parallel to the first rack, the second rack including a succession of second teeth defined by a pair of adjacent, oblique bearing surfaces respectively extending outwardly from and inwardly toward the associated face in the first direction, the second teeth having the same pitch as the first teeth;

a pawl engageable with the bearing surface of each first tooth;

means for cyclically moving the pawl in a rectangular path in a vertical plane for effecting intermittent engagement of the pawl with the bearing surfaces of successive first teeth to advance the platform by a distance equal to the pitch of the teeth; and stationary resilient means engaging the outwardly extending surface of each second tooth at the end of each advance of the platform to impart an added increment of movement to the platform, said resilient means comprising, in combination, a housing mounted in spaced relation to the second rack; a plunger having a slotted end and supported for vertical movement within the housing; a shaft carried horizontally in the slotted end of the plunger; a roller mounted vertically on the shaft; and a spring mounted in the housing in engagement with the plunger for urging the plunger in an upward direction to cause continuous engagement of the roller and the second rack.

3. Apparatus for indexing a horizontal platform in a first direction in a horizontal plane, which comprises:

a first rack disposed on one face of and extending along the platform in the first direction, the first rack including a succession of first teeth, each tooth having a vertical bearing surface;

a second rack disposed on the opposite face of the platform and extending parallel to the first rack, the second rack including a succession of second teeth defined by a pair of adjacent, oblique bearing surfaces respectively extending outwardly from and inwardly toward the associated face in the first direction, the second teeth having the same pitch as the first teeth;

a pawl engageable with the bearing surface of each first tooth;

means for cyclically moving the pawl in a rectangular path in a vertical plane for effecting intermittent engagement of the pawl with the bearing surfaces of successive first teeth to advance the platform by a distance equal to the pitch of the teeth; said pawl moving means comprising, in combination, a cam; a first yoke surrounding and selectively engaging the cam and connected to the pawl; a second yoke surrounding and constraining the first yoke for reciprocal movement in a vertical plane; and a guide block surrounding and constraining the second yoke for reciprocal movement in a horizontal plane in alignment with the first direction; and stationary resilient means engaging the outwardly extending surface of each second tooth at the end of each advance of the platform to impart an added increment of movement to the platform.

4. In a device for advancing a rack having a first set of teeth disposed on a first portion of the rack:

a second set of teeth formed on a second portion of the rack, the apexes of successive second teeth being aligned with the faces of successive first teeth;

means for engaging successive first teeth to incrementally advance the rack;

means rendered effective following each incremental advance of the rack for withdrawing the engaging means from the then engaged first tooth; and resilient means continually engaging the second portion and rendered effective upon each withdrawal of the engaging means for applying a component of force to each successive second tooth in the direction of advance.

5. Apparatus as defined in claim 3, further comprising means for rotating the cam.

6. Apparatus as defined in claim 5, in which the cam-rotating means comprises, in combination, an elongated cylinder supported for rotation in the horizontal plane above the platform, one end of the cylinder being affixed to the cam; and means for indexing the cylinder about its axis.

References Cited

UNITED STATES PATENTS

| 1,152,600 | 9/1915 | Carleton et al. | 74—75 |
| 1,268,874 | 6/1918 | Nelson | 74—55 |
| 2,859,628 | 11/1958 | Arko | 74—422 |
| 2,924,981 | 2/1960 | Critchlow | 74—575 |

FRED C. MATTERN, Jr., Primary Examiner

W. S. RATLIFF, Jr., Assistant Examiner